Nov. 20, 1945.   O. LAWRENZ   2,389,201
MEANS FOR CUTTING RECESSES
Filed Nov. 5, 1941   3 Sheets-Sheet 1
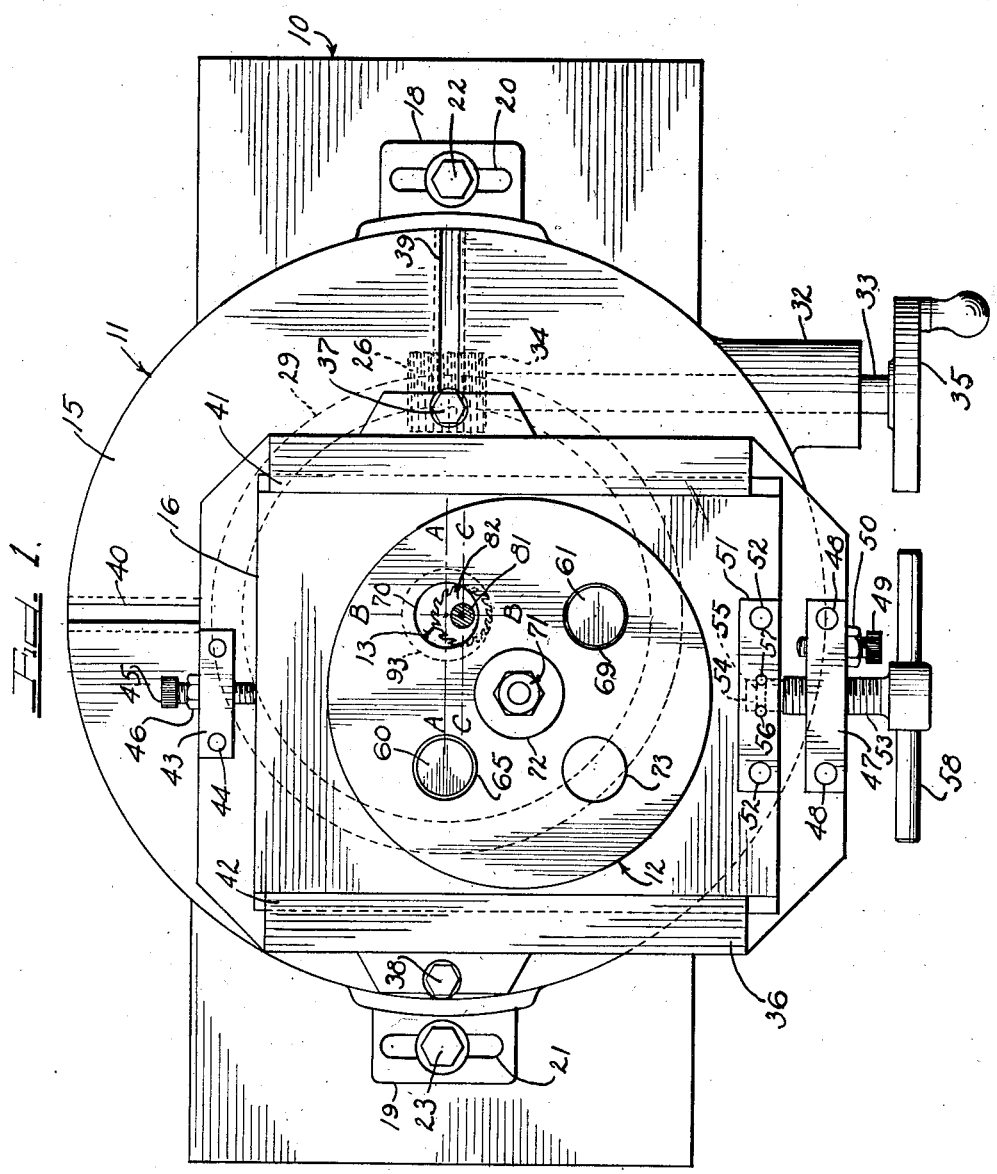
Inventor
OTTO LAWRENZ

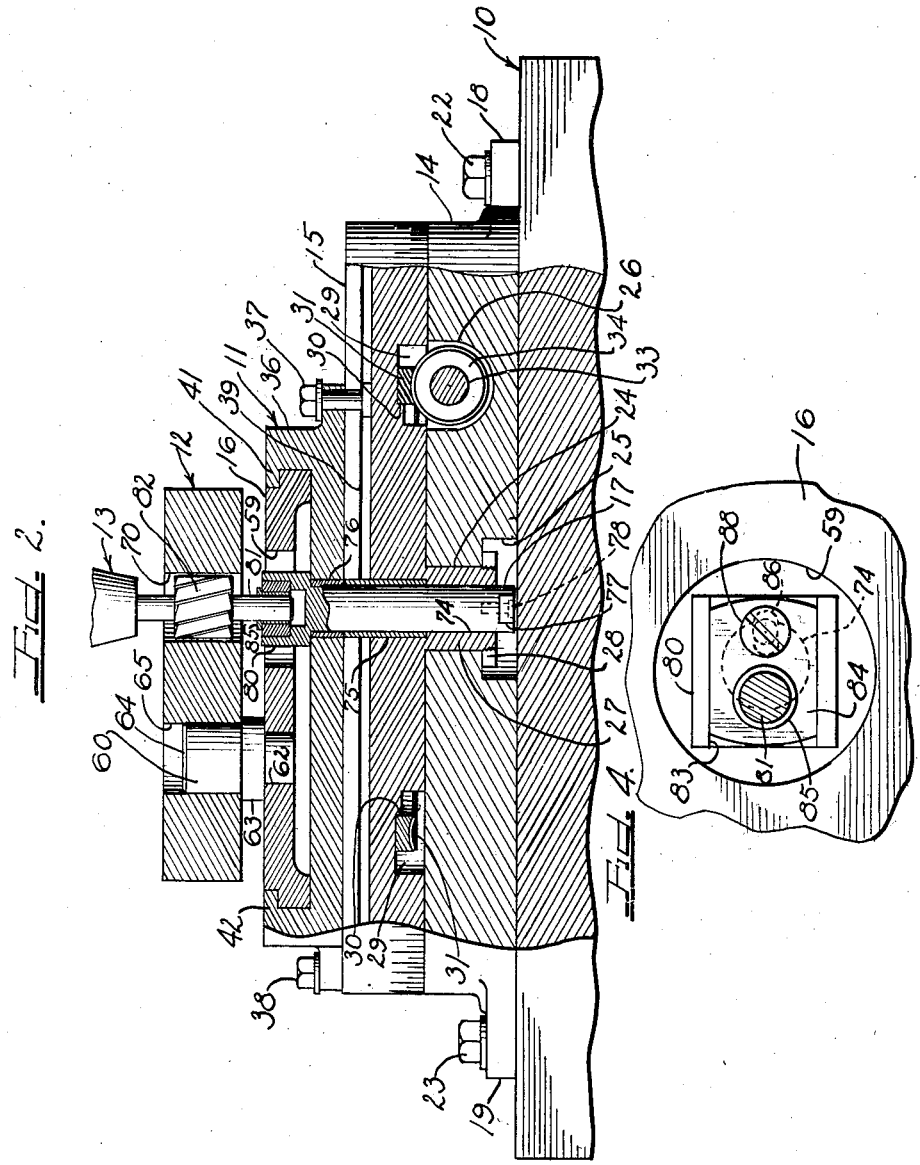

Nov. 20, 1945.  O. LAWRENZ  2,389,201
MEANS FOR CUTTING RECESSES
Filed Nov. 5, 1941  3 Sheets-Sheet 3
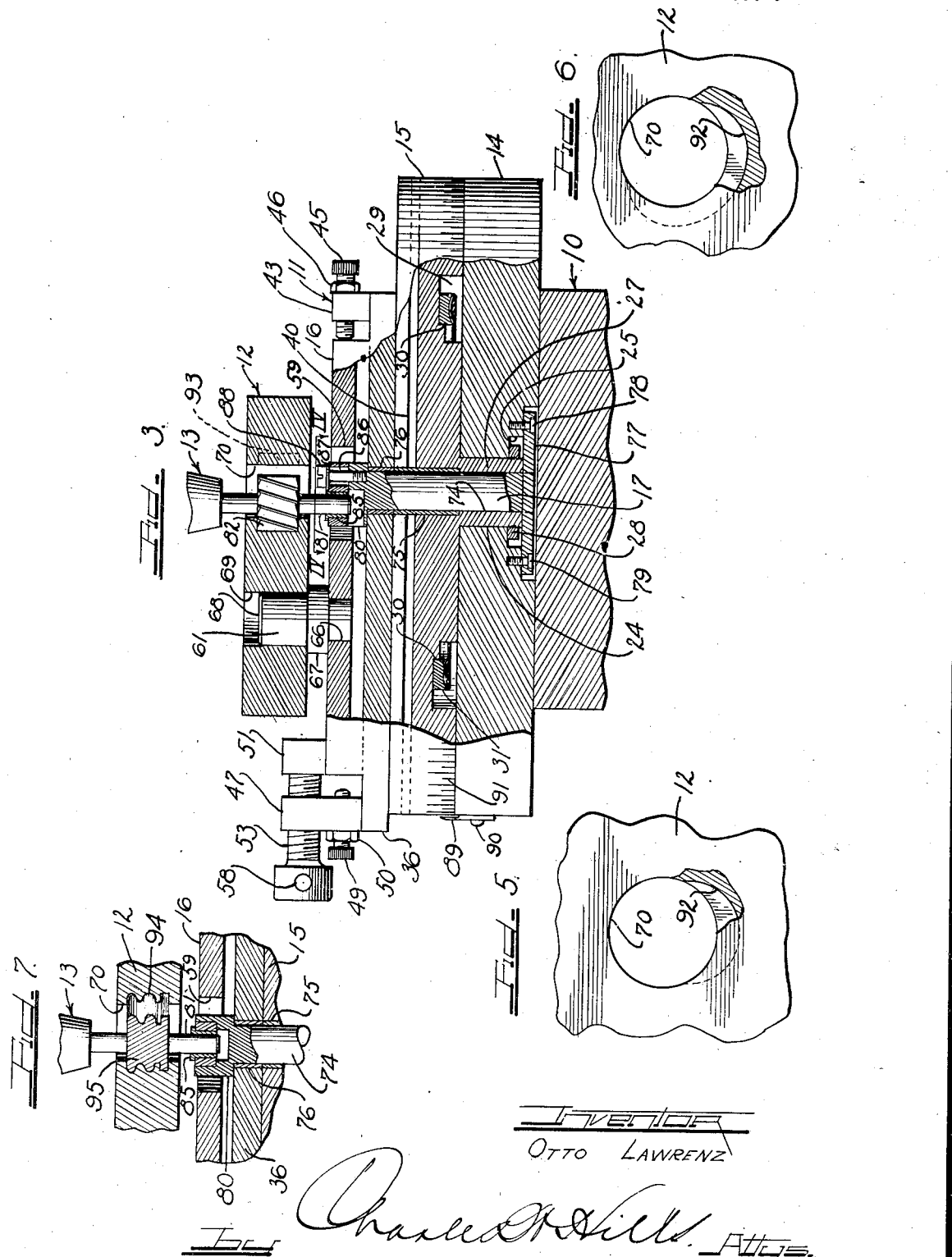
Inventor
OTTO LAWRENZ Patented Nov. 20, 1945

2,389,201

UNITED STATES PATENT OFFICE 2,389,201

MEANS FOR CUTTING RECESSES

Otto Lawrenz, Chicago, Ill.

Application November 5, 1941, Serial No. 417,935

7 Claims. (Cl. 90—20)

The present invention relates to a novel mechanism for undercutting recesses, grooves, and the like. More particularly, the invention relates to a movable mechanism having a novel pilot bearing for a cutter for undercutting recesses in a work piece mounted on the mechanism.

Considerable difficulty has been experienced in the past in cutting a work piece to provide recesses, grooves and the like of desired shape and in a desired position relative to a surface or surfaces on the work piece. This invention seeks to remedy this difficulty by the mechanism and the method to be hereinafter described.

It is therefore an object of the present invention to provide a mechanism whereby recesses, grooves, and the like may be cut in a work piece in any desired position relative to a surface or surfaces thereon.

Another object of the present invention is to provide a mechanism for slidably and rotatably mounting a work piece and having a cutter for cutting recesses, grooves and the like in any desired position therein.

A further object of the present invention is to provide a mechanism for undercutting recesses, grooves and the like in a work piece either concentric, eccentric, parallel, or non-parallel to a surface or surfaces on the work piece.

A still further object of the present invention is to provide an adjustable pilot bearing for a cutting tool by which recesses may be undercut in a work piece mounted on an associated mechanism.

Another and still further object of the present invention is to provide a mechanism, including a cutter and an adjustable pilot bearing for the cutter, for mounting a work piece, with controlled means for sliding and rotating the mounting mechanism whereby recesses, grooves and the like of a desired shape may be cut in the work piece in a predetermined position relative to a surface or surfaces thereon.

Another object of the present invention is to provide a novel method for cutting recesses, grooves and the like in a predetermined position or positions in a work piece.

A still further object of the present invention is to provide a method of sliding and rotating a work piece as desired against a cutting tool whereby recesses, grooves and the like are formed in the work piece in a predetermined position.

Another and still further object of the present invention is to provide a method of cutting recesses, grooves and the like of various shapes in a predetermined position or positions in a work piece.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a top plan view of a mechanism, with a work piece mounted thereon, for cutting recesses, grooves and the like in the work piece in accordance with the principles of this invention;

Figure 2 is a fragmentary side elevational view, with portions broken away and illustrated in vertical cross section, of the mechanism and work piece mounted thereon shown in Figure 1, Figure 3 is a view similar to Figure 2 when revolved 90°, illustrating details of construction of the mechanism illustrated in Figure 1;

Figure 4 is an enlarged fragmentary view as seen when taken in the plane indicated by the line IV—IV of Figure 3;

Figure 5 is an enlarged top plan view, with a portion broken away in horizontal section, of a portion of the work piece illustrating one form of undercut recess which may be cut in accordance with the teachings of the present invention;

Figure 6 is a view similar to Figure 5 showing the shape of another undercut recess; and, Figure 7 is a fragmentary view, similar to a portion of Figure 2, illustrating a tool for cutting recesses, grooves and the like of a different contour than that illustrated in the other figures of the drawings.

As best shown in Figures 1, 2 and 3, a stationary bed 10 has adjustably mounted thereon a recessing mechanism 11 which movably supports a work piece 12 to be grooved or recessed by a rotary cutter mechanism 13.

The recessing mechanism 11 generally comprises a base member 14, a rotatable table 15, a sliding work locating table 16, and an adjustable pilot bearing mechanism 17 for the rotary cutter.

Laterally extending flanges 18 and 19, on the base member 14, have slots 20 and 21 therein for receiving studs 22 and 23 therethrough. Suitable internally threaded openings (not shown) are provided in the bed 10 for receiving the ends of the studs whereby the base member 14 is adjustably clamped to the bed. The base member also has a bore 24 therethrough which terminates in a counterbore 25 for a purpose to be later described. A well or recess 26, as shown in Figures 1 and 2, is formed inwardly of the top surface of the base member for a purpose also to be described hereinafter.

The rotatable table 15 has a hub 27 thereon which slidably fits within the bore 24 in the base 14. As shown in Figures 2 and 3, the end of the hub 27 is externally threaded to receive thereon a nut 28. This nut is threaded on the hub to limit axial movement thereof but permits the hub to rotate freely.

A ring-shaped slot 29, having its inner surface stepped to provide a shoulder 30, is formed in the rotatable table 15 to open into the surface in contact with the base member 14. A ring gear 31 is press fitted around the shoulder 30 within the slot 29. It is to be understood, however, that the teeth forming the ring gear may, if desired, be machined in the rotatable table 15 when the slot 29 is being formed or the ring gear may be bolted, welded or otherwise secured in place.

As shown in Figure 1, a boss 32 is provided on the periphery of the base member 14 and an opening formed therethrough and through the table to terminate in the well or recess 26. A shaft 33 rotatably extends through the opening and carries on its inner end a worm gear 34 in meshed engagement with the ring gear 31. A handle 35, on the other or outer end of the shaft 33, is manually operable for rotating the table 15 through the worm gear 34 and the ring gear 31.

A work table support 36 is clamped to the rotatable table 15 by means of studs 37 and 38. In the present construction (Figures 1 and 2), the rotatable table has diametrically extending and right angularly spaced inverted T-shaped slots 39 and 40 in the upper surface thereof for receiving the heads of the studs 37 and 38. This arrangement permits the work table support to be clamped in positions in which the sliding work table 16 may be slid along either of the transverse axes of the rotatable table 15. Inasmuch as the work table support 36 is not adjustable laterally, because of central pilot bearing mechanism 17, it is readily apparent that internally threaded holes may be provided in the rotatable table 15 and studs threaded into the holes for clamping the work table support member to the table.

The member 36 has gibs 41 and 42 for slidably receiving therebetween the work locating table 16. It is to be noted in Figure 1, that the table 16 slides in a direction parallel to the adjusting slots 20 and 21 for a purpose to be later described. At one end of the gibbed support member 36, there is provided a supporting block 43 connected to the gibbed member by means of bolts 44, rivets or the like. The block has an internally threaded opening therethrough for receiving an adjustable stop screw 45 which is locked in an adjusted position by a nut 46. This stop screw defines one limit of the sliding movement of the work locating table 16. Another supporting block 47, approximately twice the height of the block 43, is connected to the other end of the gibbed member by means of bolts 48, rivets or the like. This block is also provided with an internally threaded opening therethrough for receiving an adjustable stop screw 49 which is locked in an adjusted position by a nut 50. This stop screw defines the other limit of the sliding movement of the work locating table 16.

As best shown in Figures 1 and 3, a block 51 is connected to the end of the sliding table 16, opposite and adjacent the block 47, by means of bolts 52, rivets or the like. An internally threaded opening is formed in the block 47 for threadedly receiving therethrough an actuating screw 53. The inner end 54 (Figure 1) of the screw 53 is unthreaded and has a peripheral slot 55 thereon. This end of the screw is rotatably received in an opening in the block 51 and is retained against axial movement relative to the block by means of spaced pins 56 and 57. The pins are inserted in vertical holes in the block and seat in the peripheral slot 55 to permit the screw 53 to rotate freely. An actuating handle 58 is provided at the outer end of the screw 53 whereby the sliding table is manually actuated in opposite directions between the stop screws 45 and 49 as desired.

An enlarged opening 59, offset from the center of the sliding table 16, permits sliding movement thereof without interference with the pilot bearing mechanism 17.

Work locating rest studs 60 and 61 coact with the sliding table 16 and work piece 12 to hold the latter in a desired position by which it is grooved as desired. The stud 60 (Figure 2) has a reduced end 62 which slidably seats in an opening provided in the sliding table 16. A flange 63 seats on the sliding table. The other end 64 of the stud 60 slidably seats within an opening 65 in the work piece. Likewise, the stud 61 has a reduced end 66 slidably seated in an opening in the sliding table 16, a flange 67 seated on the table, and an end 68 slidably seated in an opening 69 in the work piece.

These studs are so arranged as to position an opening 70 in the work piece for a cutting operation by the rotary cutter mechanism 13.

The work piece 12 is centrally apertured to receive therethrough a draw bolt or stud 71 which is threaded into an opening in the sliding table 16. When the stud 71 is threaded home against a washer 72, the work piece is clamped securely on the rest studs 60 and 61. It is to be understood, that only one rest stud is necessary but at least two are preferable for diametrically supporting the work piece on opposite sides of the draw bolt.

In addition, another opening 73 is illustrated in Figure 1. The openings 65, 69, 70 and 73 are so positioned relative to the center opening receiving the draw bolt 71 that their centers lie in a circle whose radius is struck from the center opening. This permits each of the holes to be separately recessed in a manner to be later described.

The pilot bearing mechanism 17 includes a support column 74 which is slidably received in a bore through the hub 27 of the rotatable table 15. Slightly enlarged aligned bores are formed in the body of the table 15 and the gibbed member 36 for slidably receiving sleeves 75 and 76. These sleeves embrace the support column 74 between the latter and the table 15 and the gibbed member 36. If excessive wear on the bores of the sliding table and gibbed member is experienced, the sleeves may easily be replaced thereby eliminating the higher cost of replacing the more expensive table, gibbed member or support column.

The lower end of the support column is slotted to receive therein a bar member 77. The bar is then locked to the base member 14 and held in the slot of the support column by means of set screws 78 and 79.

The upper end 80 of the support column is enlarged to provide an adjustable pilot bearing for the pilot end 81 of the cutter 82. As best shown in Figure 4, the enlarged end 80 is slotted as at 83 for slidably receiving therein a bearing support 84. A flanged pilot bearing 85 is pressed into an opening at one end of the bearing support while the other end of the support is slotted as at 86. A washer 87 is seated on the bearing support and receives a stud 88 therethrough which also extends through the slot 86 and is threaded into a suitable internally threaded opening in the enlarged end 80 of the support column.

When the stud 88 is loosened, the bearing support 84 is adjustable in the slot 83 within limits determined by the length of the slot 86. This provides a lateral adjustment for the pilot bearing 85. When suitably adjusted to a desired position, the stud 88 is threaded home to lock the bearing support 84 in position.

The bearing 85, obviously, may be easily replaced when desired without disassembling any other parts than removing the work piece 12 from the stud rests, and the bearing support from the groove 83.

The operation of the mechanism will now be described.

The work piece 12 is located and clamped on the locating sliding table 16 as previously described. The sliding table is a jig and obviously may be so constructed as to properly position any work piece thereon for cutting grooves, recesses and the like therein in a predetermined position relative to a surface or surfaces thereon.

In the present instance, and for purposes of illustration only, the work piece 12 is shown as being cylindrical and having four openings 65, 69, 70 and 73 therethrough. One or more of the openings receives the rest studs therein for positioning another opening to be recessed. As illustrated in Figure 1, the rest studs 60 and 61 are received in the openings 65 and 69 whereby the opening 70 is positioned to have an undercut recess formed therein.

The pilot bearing 85 is first axially aligned with the opening 70 in the work piece by the adjustment of the bearing support 84 along the axis A—A. In this position, the stop screw 45 is adjusted to abut against the sliding table 16 and then locked in place by the nut 46. An adjustment is then made to the depth of the recess to be cut in the following manner.

The stud 88 is loosened and the bearing support 84 moved laterally the exact distance of the depth of the recess to be cut. In this position, the bearing support is locked by means of the stud 88.

In order to again axially align the opening 70 and the pilot bearing 85, it is necessary to actuate the handle 58 to slide the table 16 back towards the stop screw 49 along the axis B—B. This new position is identified by the axis C—C and the distance between the axes A—A and C—C represents the depth of the recess to be cut in the opening 70. The stop screw 49 is then adjusted to abut against the sliding table 16 and locked by means of the nut 50. It is to be noted that the sliding table has been moved away from the stop screw 45 the exact distance of the depth of recess to be cut.

The cutter mechanism 13 is moved downwardly so that the pilot end 81 enters the bearing 85 and the cutter 82 is positioned in the opening 70 to a distance below the surface of the work piece at which the recess is to be cut.

As the cutter 82 rotates, the sliding table is actuated toward the stop 45 by means of the handle 58 a distance defining a reasonable cut for the cutter as the work piece is rotated.

It will be noted in Figure 3, that an indicator 89 is connected to the base member 14 by means of a stud 90 to extend in overlapping relation with the rotating table 15. The periphery of the rotating table 15 has vertical lines provided thereon at the margin of its lower surface to form a scale 91 whereby the rotation of the table 15 may be read in whole and fractions of degrees.

When the sliding table 16 has been moved a distance sufficient to provide a cut for the cutter 82, the rotating table 15 is rotated around the support column 74 any number of degrees desired by manually actuating the handle 35. As shown in Figure 5, the recess 92 is formed by sliding the table 16 only to the depth of cut shown. However, in Figure 6, the recess 92 has been cut by rotating the table 15 a distance of 90°. Obviously, an undercut recess of any angularity may be cut even to 360° as shown at 93 in Figure 1.

By separately making individual cuts of a depth which will permit the cutter 82 to rotate at full speed without imposing too great a load thereon, a recess to a full depth may be cut. This requires sliding the table 16 for each cut and then rotating the table 15 to the desired number of degrees. When the table 16 finally abuts against the stop screw 45 and is rotated at that position, the recess will be cut in final form.

It will be apparent from the foregoing, in adjusting the pilot bearing 85 from the axis A—A to the axis C—C, that either the rotary cutter mechanism 13 or the base member 14 must be adjustable. In the present instance, the base member 14 is adjustable on the base 10 by means of the slots 20 and 21 and the studs 22 and 23. While the table 16 slides along the axis B—B between the axes A—A and C—C, the rotational axis of the table 15 must always be at the intersection of the axes A—A and B—B. This will assure that the finished undercut recess 93 will be in concentrically with the periphery of the opening 70. It follows, of course, that the rotational axis of the table 15 may be varied as desired so that the finished undercut recess will be eccentric to the periphery of the opening 70.

Summarizing the foregoing, the cutter 82 is inserted in the opening 70 and the pilot end 81 inserted in the bearing 85. This position is along the intersection of the axes A—A and B—B and defines the vertical rotational axis of the cutter. The stop screw 45 is then moved into abutment with the sliding table 16 and tightened by the nut 46. The adjusting stud 88 is then loosened and the base member 14 is adjusted along the axis B—B by loosening the studs 22 and 23. The distance adjusted is the depth of the recess desired. Studs 22 and 23 are then tightened.

During this latter adjustment, the cutter 82 maintains the work piece 12 and the sliding table 16 against movement while the base member 14, rotating table 15 and gibbed member 36 are moved the adjusted distance. The stop screw 45 is also moved away from the sliding table 16 the adjusted distance. Stud 88 is now tightened.

The sliding table is then actuated from the axis A—A toward the axis C—C by distances defining individual cuts which the rotary cutter can take. Each individual cut is then angularly made around the rotational axis to the number of degrees required. When the table 16 has finally been moved to the axis C—C and rotated as desired, the recess formed is of proper depth.

Although the foregoing describes the table 16 as being slid toward the stop screw 45, it is obvious that recesses may be cut in the same manner by adjusting the pilot bearing in a direction whereby the table must be slid toward the stop screw 49.

Furthermore, any type of work piece may be mounted on the table 16 by providing a suitable jig construction in accordance with the needs of each work piece. Also, a recess or groove may be cut in any predetermined position relative to a surface or surfaces of the work piece and is not necessarily restricted only to undercutting an opening.

Figure 7 illustrates another form of recess 94 which may be cut in a manner as previously described. In this instance, a cutter 95 having an uneven periphery is used to shape the recess 94 having a contour of the same shape as the periphery of the cutter. This type of recess is particularly adapted for bearings.

It will be apparent from the foregoing that I have provided a mechanism by which grooves or recesses of any desired contour may be formed in a work piece in predetermined relation, either concentric with or eccentric to, a surface or surfaces thereon.

While particular embodiments of this invention have been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A cutting machine for supporting a work piece to be recessed by a rotary cutter comprising support means, bearing means for the rotary cutter adjustably mounted on said support means, a table mounted for rotation on said support means, a second table for carrying the work piece slidably mounted on said first table, means for shifting said support means and said first table relative to said cutter and said second table, and means for rotating said first table and for sliding said second table to afford engagement of the work piece by the rotary cutter.

2. A cutting machine for supporting a work piece to be recessed by a rotary cutter comprising a support column, bearing means for the rotary cutter mounted on said support column, means for adjusting said bearing means toward and away from the axis of said support column, a table mounted for rotation on said support column, a second table for carrying the work piece slidably mounted on said first table, means for shifting said support column and said first table, means for sliding said second table relative to the cutter the shifted distance of said support column, and means for rotating said second table relative to the axis of the cutter and around said supporting column.

3. A cutting device for recessing a work piece comprising a shiftable bearing support, a cutter tool bearing adjustably mounted on said bearing support, a table rotatably mounted around said bearing support, a second table for carrying the work piece slidably mounted on said first table, means for shifting the bearing support between starting position of the cutter and the desired limit of lateral movement of the work piece while sliding the first table relative to the second table to hold the work piece in starting position, means for locking the tool bearing on the shifted bearing support, means for moving the second table relative to the first table to move the work piece against the cutter, and means for rotating the first table to carry the work piece around a desired cutting angle.

4. A cutting machine for recessing a work piece by a rotary cutting tool comprising a stationary bed, a supporting member adjustably mounted on said bed, bearing means on said supporting member, a first table rotatably mounted on said bearing means, a second table slidably mounted on said first table for carrying the work piece, a bearing for the rotary cutting tool adjustably mounted on said bearing means, means for rotating said first table and means for sliding said second table to move said work piece against the rotary cutting tool and thereby recess the work piece.

5. A cutting machine for recessing a work piece by a rotary cutting tool comprising a support member, a bearing column on said support member, a first table rotatably mounted on said bearing column, meshed gear means carried by said support member and first table, means for actuating said gear means for rotating said rotatable table, a gibbed member on said first table, a second table for carrying said work piece and slidably mounted on said gibbed member, adjustable stop means on said gibbed member for limiting the sliding movement of said second table, means for sliding said second table, bearing means for the rotary cutting tool adjustably mounted on said bearing column, and means for moving said support member, bearing column and rotating member relative to said second table, bearing means and the rotary cutting tool along the sliding axis of said second table whereby the work piece is slid and rotated against the cutting tool to form a recess of desired dimensions.

6. In a cutting mechanism having a rotary cutting tool, a rotatable table, and a slidable table for carrying a work piece to be recessed by the cutting tool, the improvement of a support column and cutting tool bearing which comprises a hub member rotatably carrying said rotatable table thereon, a slot in one end of said hub member, a bearing support slidable in said hub member slot and having an elongated slot therein, a pilot bearing for said cutting tool in said bearing support, and a headed stud extending through said elongated slot and engaging a threaded opening in said hub member permitting adjustment of said bearing support along the length of said elongated slot.

7. In a cutting mechanism having a rotary cutting tool, a rotatable table, and a slidable table for carrying a work piece to be recessed by the cutting tool, the improvement of a bearing support column which comprises relatively movable support members, means for adjusting one of said members relative to the other member, a hub member having laterally extending slots in the ends thereof, a bar member extending through one end slot and being connected to said one support member, a replaceable sleeve on said hub member, said sleeved hub member rotatably carrying said rotatable table, the other slotted end of said hub member extending through an enlarged opening in said slidable table, a bearing support slidable in the slot at said other end of said hub member and having an elongated slot in one end thereof, a pilot bearing removably mounted on the other end of said bearing support, and means extending through said elongated slot into said hub member permitting adjustment of said bearing support in the slotted end of said hub member the length of said elongated slot, said means for adjusting one of said support members being operable to move said sleeved hub member and rotatable table relative to said slidable table and said pilot bearing.

OTTO LAWRENZ.